(12) United States Patent
Lester et al.

(10) Patent No.: US 7,102,779 B2
(45) Date of Patent: Sep. 5, 2006

(54) COLLECTIVE DOCUMENT PROCESSING BY MULTIPLE PRINTING DEVICES

(75) Inventors: Samuel M. Lester, Boise, ID (US); Jimmy Sfaelos, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 945 days.

(21) Appl. No.: 10/045,511

(22) Filed: Nov. 7, 2001

(65) Prior Publication Data

US 2003/0086117 A1 May 8, 2003

(51) Int. Cl.
*G06F 15/00* (2006.01)
(52) U.S. Cl. .................. 358/1.15; 358/1.18; 709/205; 709/214; 710/15; 710/20; 710/33
(58) Field of Classification Search ............... 358/1.15, 358/1.18; 709/205, 214; 710/15, 20
See application file for complete search history.

(56) References Cited

U.S. PATENT DOCUMENTS

| | | | |
|---|---|---|---|
| 5,704,602 A | 1/1998 | Taylor et al. | 270/1.02 |
| 5,913,018 A * | 6/1999 | Sela | 358/1.17 |
| 6,084,688 A | 7/2000 | Stumbo et al. | 358/1.17 |
| 6,321,266 B1 * | 11/2001 | Yokomizo et al. | 709/226 |
| 6,331,896 B1 * | 12/2001 | Morita | 358/1.18 |
| 6,347,852 B1 * | 2/2002 | Chen | 347/5 |
| 6,654,136 B1 * | 11/2003 | Shimada | 358/1.15 |
| 6,823,147 B1 * | 11/2004 | Jackelen et al. | 399/16 |
| 6,825,943 B1 * | 11/2004 | Barry et al. | 358/1.15 |
| 2003/0033352 A1 * | 2/2003 | Stringham | 709/203 |
| 2004/0042042 A1 * | 3/2004 | Utsunomiya | 358/1.15 |

* cited by examiner

*Primary Examiner*—Joseph R. Pokrzywa
*Assistant Examiner*—Mark R. Milia

(57) ABSTRACT

Documents are processed collectively by multiple printing devices. A printing device receives a request to print a document, and partitions the document into one or more blocks. The printing device communicates, to each of one or more additional printing devices, at least one of the one or more blocks. The additional printing devices convert the portions they receive to a print-ready format, and return the portions in the print-ready format to the printing device. The printing device uses the portions in print-ready format received from the additional printing devices to print the document.

12 Claims, 5 Drawing Sheets

COLLECTIVE DOCUMENT PROCESSING BY MULTIPLE PRINTING DEVICES

TECHNICAL FIELD

This invention relates generally to printing devices, and more particularly to collective document processing by multiple printing devices.

BACKGROUND

As computer technology has advanced, computers have become increasingly commonplace in homes, businesses, and elsewhere, and have become increasingly inter-connected. Local area networks have become commonplace in businesses, and are becoming increasingly common in homes. Furthermore, these local networks are becoming increasingly connected to wide area networks (e.g., the Internet), allowing communication among computers throughout the world.

One task that many users often like to perform with their computers is to generate hard copies of their documents by printing them to a printer. However, given the computing power of many modem computers, the documents to be printed can be fairly complex and require a substantial amount of time at the printer to process the documents (that is, to convert them to a format that the print engine of the printer is able to render and generate a hard copy of the document contents). This substantial amount of time can cause the printer to print pages of documents at a slower rate than it is mechanically capable of printing, which is typically undesirable to the user. For example, a printer capable of printing 25 pages per minute may only be able to print 10 pages per minute due to the substantial amount of processing that the printer is performing.

One solution to this problem is to build printers with faster components (e.g., controllers and/or processors) that can process the documents faster and thus print the documents faster. However, such faster components can significantly increase the cost of the printers. Thus, there remains a need to improve the speed of processing of documents for printing by printers without significantly increasing the cost of the printer.

SUMMARY

Collective document processing by multiple printing devices is described herein.

In accordance with one aspect, a printing device receives a request to print a document, and partitions the document into one or more blocks. The printing device communicates, to each of one or more additional printing devices, at least one of the one or more blocks. The printing device receives, from the one or more additional printing devices, a set of print-ready bits corresponding to the blocks communicated to the one or more additional printing devices, and uses the received print-ready bits to print the document.

In accordance with another aspect, a printing device receives, from another printing device, one or more blocks of a document to be printed at the other printing device. The printing device converts the one or more portions to a print-ready format, and returns the one or more portions in the print-ready format to the other printing device for printing at the other printing device.

DETAILED DESCRIPTION

Collective document processing by multiple printing devices is described herein. When a printing device receives a request to print a document, the printing device separates the document into multiple blocks. Each of these blocks is communicated to a different one of multiple additional "buddy" printing devices for conversion of the blocks into a print-ready format. The converted blocks are returned to the printing device, which can generate a hard copy of the data represented by the converted blocks. Thus, the processing of the document is performed collectively by multiple printing devices.

Figure 1:
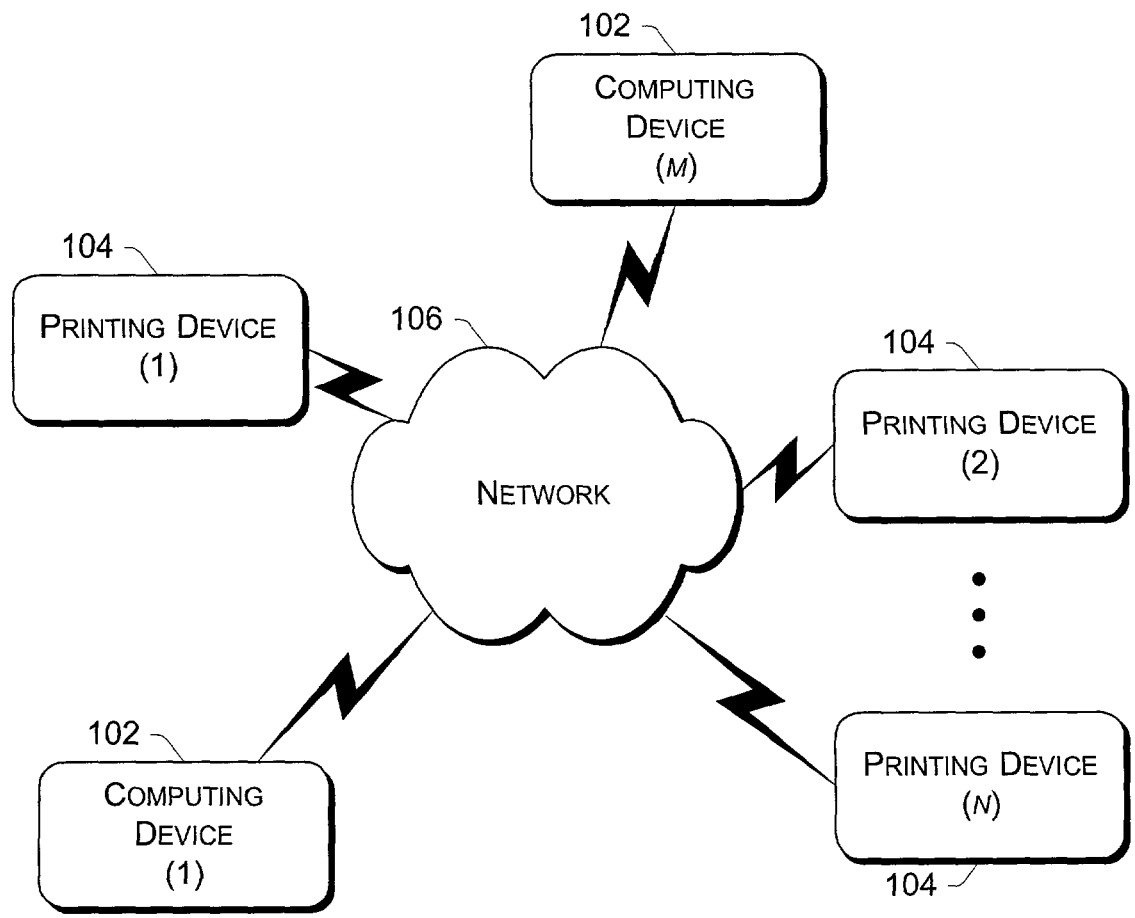
FIG. 1 illustrates an exemplary environment in which collective document processing can be employed.

FIG. 1 illustrates an exemplary environment 100 in which collective document processing can be employed. In environment 100, multiple (m) computing devices 102 are coupled to multiple (n) printing devices 104 via a network 106. Network 106 is intended to represent any of a wide variety of conventional network topologies and types (including wired and/or wireless networks), employing any of a wide variety of conventional network protocols (including public and/or proprietary protocols).

Computing devices 102 can be any of a wide variety of conventional computing devices, including desktop PCs, workstations, server computers, Internet appliances, gaming consoles, handheld PCs, cellular telephones, personal digital assistants (PDAs), etc. Computing devices 102 can be the same types of devices, or alternatively different types of devices.

Printing devices 104 can be any of a wide variety of conventional devices capable of generating a hard copy of data (e.g., received from one of computing devices 102). Examples of printing devices include printers, facsimile machines, multi-function machines (e.g., capable of performing multiple functions, such as the functions of both a printer and a facsimile machine). Printing devices 104 can generate hard copies of data in any of a variety of manners, such as by using toner (e.g., in laser printers), ink (e.g., in inkjet printers, bubblejet printers, dot matrix printers, etc.), heat applied to heat-sensitive print media (e.g., thermal printers), and so forth. Printing devices 104 can be the same types of devices, or alternatively different types of devices.

During operation, a computing device 102 communicates a request to one of printers 104 to print a document. The printer 104 to which the computing device 102 directs the request is referred to as the "recipient" or "principal" printer. The principal printer separates the document into one or more portions and assigns these portions to one or more other printers 104, each of which is referred to as a "buddy" printer. The buddy printers convert the portions that they are assigned into a print-ready format. The print-ready format, as used herein, refers to a format in which the document is saved as hardware-ready bits (also referred to as raster bits) that can be supplied to a print engine of a printing device and used by the print engine to control the application of print substance (e.g., ink or toner) to the print medium (e.g., paper).

Figure 2:
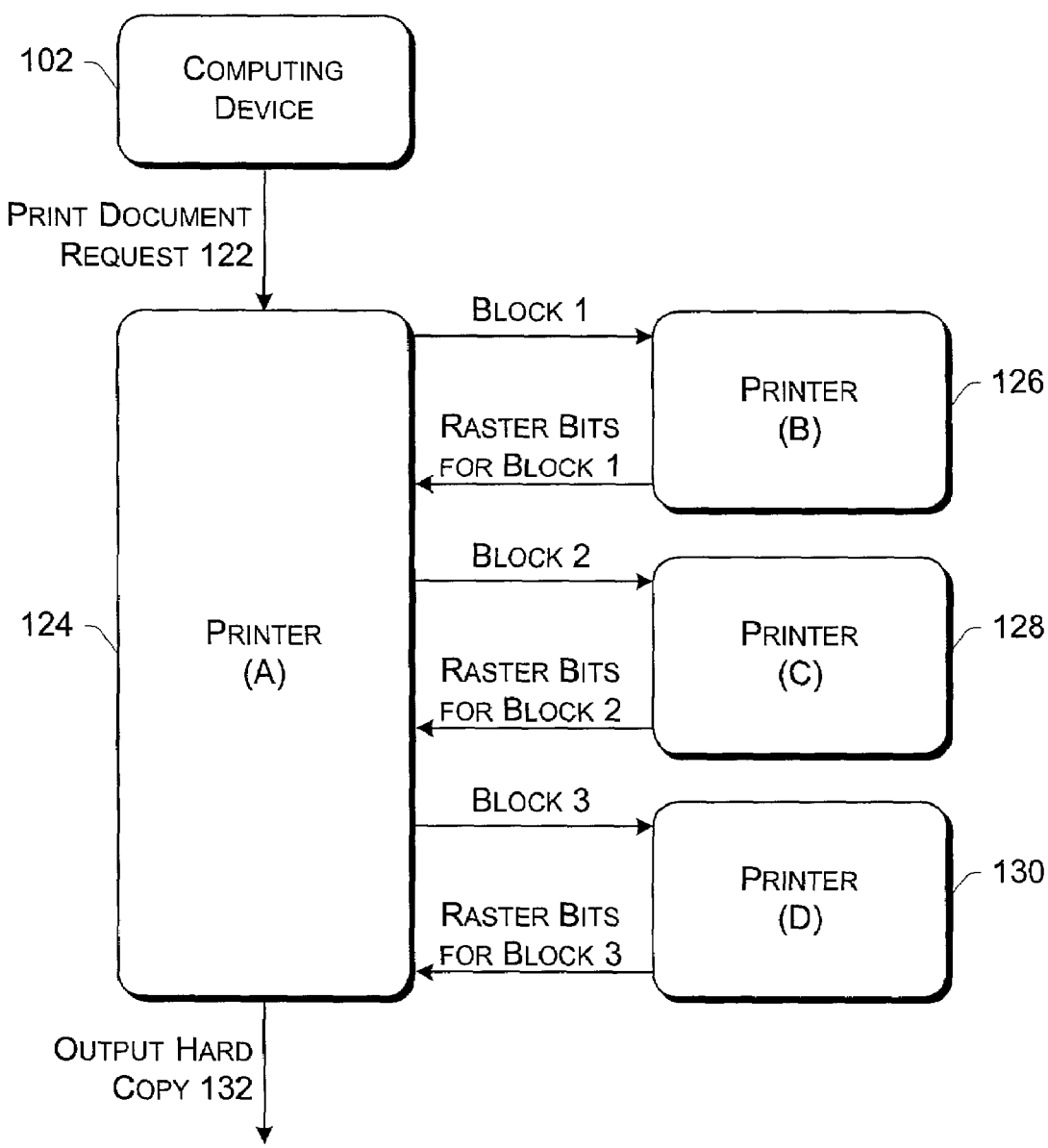
FIG. 2 illustrates an exemplary system in which collective printing is performed.

FIG. 2 illustrates an exemplary system 120 in which collective printing is performed. A computing device 102 communicates a print document request 122 to a recipient printer 124. Printer 124 has three buddy printers in system 120: printers 126, 128, and 130. Printer 124 separates the document received as part of request 122 into three blocks, each to be processed by one of the printers 126, 128, and 130. Alternatively, printer 124 may separate the document into four blocks and process a block itself. As used herein, a printing device "processing" a document or portion thereof refers to the printing device converting the document or portion thereof into a print-ready format.

Printer 124 communicates block 1 of the document to printer 126. Printer 126 converts block 1 to a set of raster bits (print-ready hardware bits) and returns the raster bits for block 1 to printer 124. Similarly, printer 124 communicates block 2 of the document to printer 128, which in turn converts block 2 to a set of raster bits and returns the raster bits for block 2 to printer 124. Printer 124 communicates block 3 of the document to printer 130, which in turn converts block 3 to a set of raster bits and returns the raster bits for block 3 to printer 124.

Printer 124 receives the various sets of raster bits from printers 126, 128, and 130, and generates a hard copy 132 of the document corresponding to request 122 using the received raster bits. Thus, although printer 124 generates the hard copy of the requested document, the processing of the document is performed collectively by the buddy printers (and optionally printer 124 as well). However, because the processing is shared by multiple printers, hard copy 132 can frequently be generated more quickly than printer 124 is otherwise able to do when performing all of the processing itself. This collective processing can be performed transparently to the user of computing device 102, as well as transparently to computing device 102.

Figure 3:
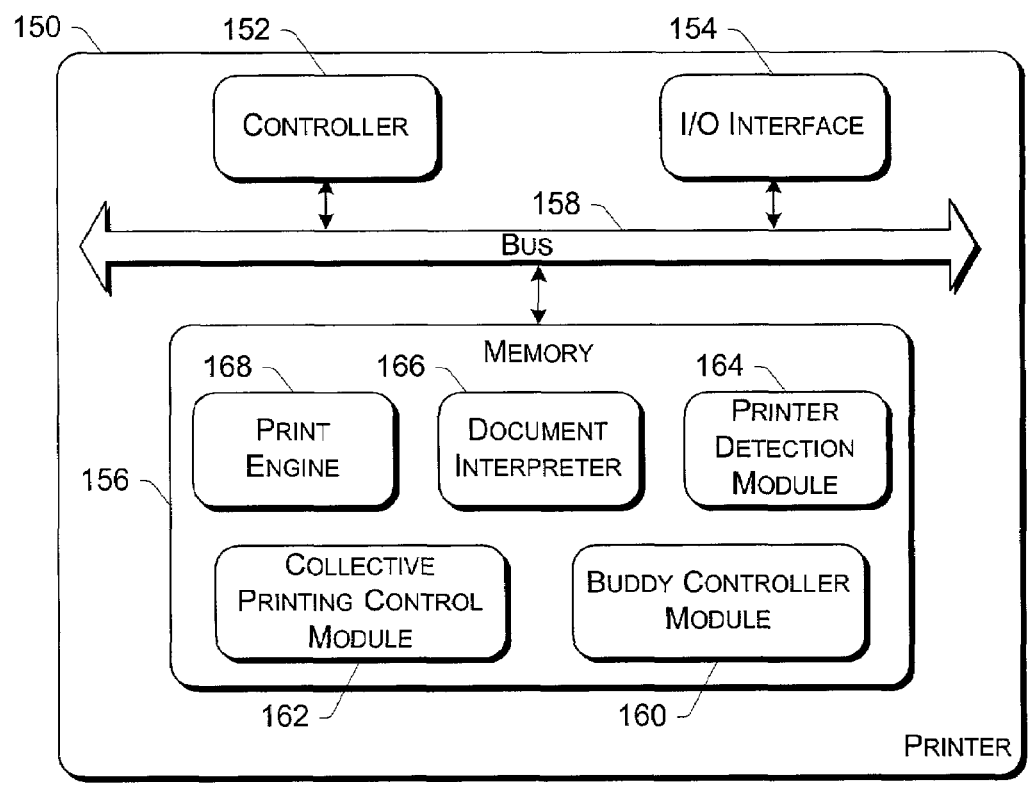
FIG. 3 which illustrates an exemplary printer that can be used with collective document printing.

The collective printing process will now be discussed in additional detail with reference to FIG. 3, which illustrates an exemplary printer 150. Printer 150 may be a principal printer for some requests, and a buddy printer for other requests. Printer 150 may be, for example, a printer 104 of FIG. 1, or a printer 124, 126, 128, or 130 of FIG. 2. Printer 150 includes a processor or controller 152, input/output (I/O) interface 154, and memory 156, coupled together via a bus 158. I/O interface 154 is an interface allowing printer 150 to communicate with other printers and computing devices via a network. Controller 152 executes instructions stored in memory 156. Memory 156 represents any of a wide variety of volatile and/or nonvolatile memories, such as RAM and/or ROM.

The process carried out by a typical printer in printing a document involves receiving a print request and a document to be printed from a computing device. The received document is converted to a set of print-ready or hardware-ready bits. The manner in which this conversion is performed can vary by implementation, and is dependent on the format of the received document. For example, different processes are performed to convert a portable document format (PDF) document into hardware-ready bits than are used to convert a postscript document into hardware-ready bits. These hardware-ready bits are supplied directly to the print engine of the printer, which controls the application of a print substance onto a print medium so that the print substance is applied in accordance with the rendered data. This printing process is well-known to those skilled in the art. The process carried out by printer 150 differs from this typical process by implementing collective processing of documents, as discussed herein.

Memory 156 stores a buddy controller module 160, a collective printing control module 162, a printer detection module 164, a document interpreter 166, and a print engine 168. These system components 160–168 are each a series of one or more instructions executable by controller 152. Printer 150 can be pre-configured (e.g., by the manufacturer of printer 150) to include components 160–168, or alternatively one or more of components 160–168 may be subsequently loaded into memory 156. For example, a component 160–168 (or portion thereof) may be received at printer 150 from an external source (e.g., a computing device) via I/O interface 154. It should be noted that memory 156 may be made up of multiple types of memory (e.g., RAM and ROM), and that instructions may exist in the different memories at different times (or alternatively in both memories concurrently). For example, instructions may be stored in nonvolatile ROM, and then transferred to volatile RAM when printer 150 is powered-on, allowing controller 152 to retrieve and execute the instructions from RAM.

When printer 150 receives a print request from a computing device, the request as well as the document corresponding to the request are made available to collective printing control module 162. Collective printing control module 162 separates the document into one or more blocks (also referred to as portions), with each block typically including at least one page of the document. In certain situations there is only one block for the document, and that block includes the entire document. A page of a document, as used herein, refers to the data of a document that is intended to be printed onto one piece of print media (e.g., onto one sheet of paper). Some document formats, such as PDF, store a record of where objects (including pages) are located within the document. This allows any device reading the document to readily identify where the page breaks are. In the case of PDF, a catalog is maintained that includes byte offsets of where objects (e.g., pages as well as the letters, images, icons, etc. on those pages) are located in the document.

The number of blocks that a document is separated into by control module 162 can vary depending on the size of the document and the buddy printers that are accessible to printer 150. In one implementation, the number of blocks is equal to the number of buddy printers (or alternatively the number of buddy printers plus one to account for the recipient printer). In situations where the number of buddy printers exceed the number of pages in the document, then the number of blocks is equal to the number of pages (with each page being one block).

Alternatively, while sending out blocks of the document to the buddy printers, the principal printer also begins processing the entire document itself. For each page of the document, if the principal printer finishes processing the page before the buddy printer that is assigned to process that page is able to process the page and return it to the principal printer, then the principal printer uses the hardware-ready bits it has generated itself for the page. However, if the buddy printer that is assigned to process the page is able to process the page and return it to the principal printer before the principal printer has processed the page, then the principal printer stops its processing of that page and uses the hardware-ready bits received from the buddy printer. Thus, the hardware-ready bits used by the principal printer are those it receives first, whether it generated the bits itself or a buddy printer generated them.

In one implementation, the pages of a document that are included in a block assigned to a printer are identified based on a value P that is determined as follows:

P=PageNumber mod NumPrinters where PageNumber represents a particular page number in the document and NumPrinters represents how many buddy printing devices are accessible to the printer. For each page, the value P identifies which of the buddy printing devices that page is to be assigned to based on the page number and how many buddy printing devices are accessible to the printer. Alternatively, the document may be separated into NumPrinters+1 blocks, the additional one being added to represent printer 150.

By way of example, with reference to FIG. 2, assume that printers 124, 126, 128, and 130 are collectively processing a document that is 30 pages total in length. Printer 124 separates the document into four blocks, and assigns the pages as follows: pages 1, 5, 9, 13, 17, 21, 25, and 29 are assigned to printer 124; pages 2, 6, 10, 14, 18, 22, 26, and 30 are assigned to printer 126; pages 3, 7, 11, 15, 19, 23, and 27 are assigned to printer 128; and pages 4, 8, 12, 16, 20, 24, and 28 are assigned to printer 130.

The pages included in a particular block may also be determined in different manners, such as assigning groups of consecutive pages to printers (e.g., for a 30-page document, assigning pages 1 through 8 to printer 124, pages 9 through 16 to printer 126, pages 17–23 to printer 128, and pages 24 to 30 to printer 130).

Collective printing control module 162 can communicate a block to a buddy printer in a variety of different manners. In one implementation, module 162 communicates the entire document to the buddy printer along with an indication of which portions of that document are assigned to the buddy printer as its block. In another implementation, module 162 communicates to the buddy printer only that portion of the document that it is assigned as its block.

In one implementation, collective printing control module 162 is programmed with the identification of (e.g., network address of) printers that are accessible to use as buddy printers for collective document processing. Module 162 can be programmed, for example, by a system administrator via I/O interface 154 or a keypad (not shown) of printer 150.

Alternatively, printer 150 may optionally include printer detection module 164 which operates to attempt to identify buddy printers that printer 150 can communicate blocks to for processing. This detection can be carried out in a variety of different manners. In one implementation, printer 150 can send a query message to each device on the same network as printer 150 (e.g., to each network address) querying the device as to whether it can be a buddy printer for collective document processing. Any device that can be a buddy printer (e.g., includes a buddy controller module 160) will understand the query message and respond that either it is willing to be or is not willing to be a buddy printer (or, if it is not willing to be a buddy printer, it may not respond to the query message). A particular printer may indicate it is not willing to be a buddy printer if it is already overloaded (e.g., it is already performing too much processing of documents). Any device that is not a printer, or is a printer that does not have the necessary components to be a buddy printer (e.g., does not have a buddy controller module 160), will not understand the query message and will not respond to printer 150.

Other detection processes may also be used, such as a centralized server or other device responsible for maintaining a record or list of printers in the network that may optionally be buddy printers, and printer 150 may access this record or list.

A network may have different types of printing devices attached thereto, and these different types may have different capabilities (e.g., operate at different speeds to convert content to print-ready bits). Additionally, due to the areas of the networks that the different printing devices may be attached to, there may be additional latencies in communicating data to and from certain printing devices. Collective printing control module 162 optionally attempts to capitalize on these different capabilities and latencies. In one implementation, a test document is communicated from control module 162 to each of the buddy printing devices. Control module 162 measures, for each buddy printing device, the time between sending the test document and receipt of the print-ready format of the document from the buddy printing device. Control module 162 can use these different measurements to determine how quickly the different buddy printing devices can generate the print-ready format for blocks of documents relative to one another. By measuring the time between sending of the document and receipt of the document in print-ready format, both processing capabilities and network latencies are accounted for.

Alternatively, rather than control module 162 performing the measuring, each buddy printer itself may perform the measuring (e.g., the buddy controller module 160 of each buddy printer). Each of these buddy printers then returns, along with the test document in print-ready format, the measurement it has made to control module 162. Control module 162 can then use these different measurements to determine how quickly the different buddy printing devices can process blocks of a document relative to one another. By having the buddy printers perform the measurements, the processing capabilities of the buddy printing devices are accounted for without being affected by network latencies.

Once control module 162 has these different measurements of buddy printing device capabilities, module 162 can direct larger blocks to the faster printing devices and smaller blocks to the slower printing devices. The exact sizes of the different blocks can vary, and in one implementation module 162 determines the block sizes based on printer speed so that each buddy printing device is finished with its processing at approximately the same time. For example, if there are two buddy printers and one is determined to be twice as fast as the other, then a recipient printing device could communicate 22 pages of a 33 page document to the faster printer and 11 pages to the slower printer, and have both printers finish their processing of their respective pages at approximately the same time.

Which pages are included in a block assigned to a printing device may also be based on the relative speeds of the different printing devices. Following the previous example, where 22 pages are assigned to the faster printer and 11 pages are assigned to the slower printer, pages 1, 2, 4, 5, 7, 8, 10, 11, 13, 14, 16, 17, 19, 20, 22, 23, 25, 26, 28, 29, 31, and 32 may be assigned to the faster printer, while pages 3, 6, 9, 12, 15, 18, 21, 24, 27, 30, and 33 are assigned to the slower printer.

A buddy controller module 160 of a printer 150 that is responsible for processing a block of a document receives that block from the principal printer (which may be itself). Buddy controller module 160 makes the block available to document interpreter 166, which operates to generate the print-ready format for the block. The exact manner in which interpreter 166 operates is dependent on the format of the document. In one implementation, in which the document is a PDF document, interpreter 166 is a PDF interpreter.

Once the print-ready format has been generated, buddy controller module 160 returns the block in print-ready format to the collective printing control module 162 of the principal printing device. Module 162 then makes the document in print-ready format available to print engine 168 for printing. The operation of document interpreter 166 of printer 150 in generating the print-ready format is the same operation as would be performed if printer 150 were printing the document itself without collective document processing. However, rather than communicating the print-ready bits to a print engine, they are returned to buddy controller module 160.

The print-ready format of a document can be returned to the collective printing control module 162 of the principal printer in pieces (e.g., pages) or alternatively as a whole. Buddy controller module 160 may communicate print-ready versions of each page back to the principal printer as soon as the print-ready version for the page has been generated, or alternatively it may wait until the entire block it has been assigned has been converted to print-ready form.

Additionally, buddy controller module 160 may communicate the print-ready versions of each page (whether individually or as a group) to the collective printing control module 162 of the principal printer as soon as the print-ready versions are ready, or alternatively it may send an indication to the module 162 that the print-ready versions have been generated and then wait until the module 162 requests the print-ready versions. Waiting until the module 162 requests the print-ready versions allows the principal printer to use the buddy printer for storage of the print-ready bits until the principal printer is ready to use them to print the particular page. If the print-ready versions are returned to the principal printer before it is ready to use them to print the particular page(s), the principal printer stores the bits of the print-ready version (either at a storage device local to the printer or a remote storage device (e.g., a network shared disk)) until it is ready to use them to print the particular page(s).

In one implementation, each buddy controller module 160 also has the ability to reject a collective document processing request received from a principal printing device. Rejecting the request is an indication that the buddy device is not able to convert the block it receives into a print-ready format because it currently has insufficient resources to devote to the conversion process. Buddy controller module 160 may reject such a request if, for example, the buddy printer is already too overloaded with its own processing (e.g., processing and printing requests for which it is the principal printer), or processing of previously received requests from other principal printing devices.

If a principal printing device receives a rejection from a buddy printing device, a variety of different remedial actions may be taken. In one implementation, the principal printing device communicates the block to a different buddy printing device, or processes the block itself. In another implementation, the principal printing device separates the block into multiple sub-blocks and distributes these sub-blocks to the other buddy printing devices (and optionally processes one of the sub-blocks itself). In yet another implementation, the principal printing device does not initially assign blocks to all of the buddy printing devices. Rather, the principal printing device leaves at least one buddy printing device as a "backup", and if a buddy printing device does reject a request, then the block is communicated to the backup device.

A principal printing device, upon receiving a rejection from a buddy printing device, may also choose to remove that device from its record of available buddy printing devices. This may be done indefinitely (e.g., until a system administrator overrides the removal). The removal may be done immediately upon receipt of a rejection, or alternatively based on a pattern of behavior. For example, after a threshold number of blocks for different print requests have been communicated to the buddy printing device, if at least a certain percentage of those have been rejected then the buddy device is removed from the principal device's record.

It should be noted that, although printer 150 includes both a collective printing control module 162 and a buddy controller module 160, some printers may not include both components. For example, a printer 150 that is not to be a buddy printer, but that is to take advantage of collective document processing by distributing blocks to buddy devices for processing, need not include buddy controller module 160. By way of another example, a printer 150 that is to be a buddy printer but that is not to communicate blocks to other buddy printers, need not include collective printing control module 162.

In alternate embodiments, printer 150 may operate in conjunction with a print server. A print server is a computing device coupled to a printer that performs at least some of the processing of documents for printing by the printer. Print requests are sent to the print server rather than the printer, but the device sending the print requests (e.g., a user's desktop computer) need not be concerned with whether the printer or the print server is doing the processing (in some situations, the device sending the print requests need only know to send them to the print server rather than the printer). By way of example, one or more of collective printing control module 162, buddy controller module 160, and document interpreter 166 may be implemented wholly or partially in a print server rather than in printer 150.

Figure 4:
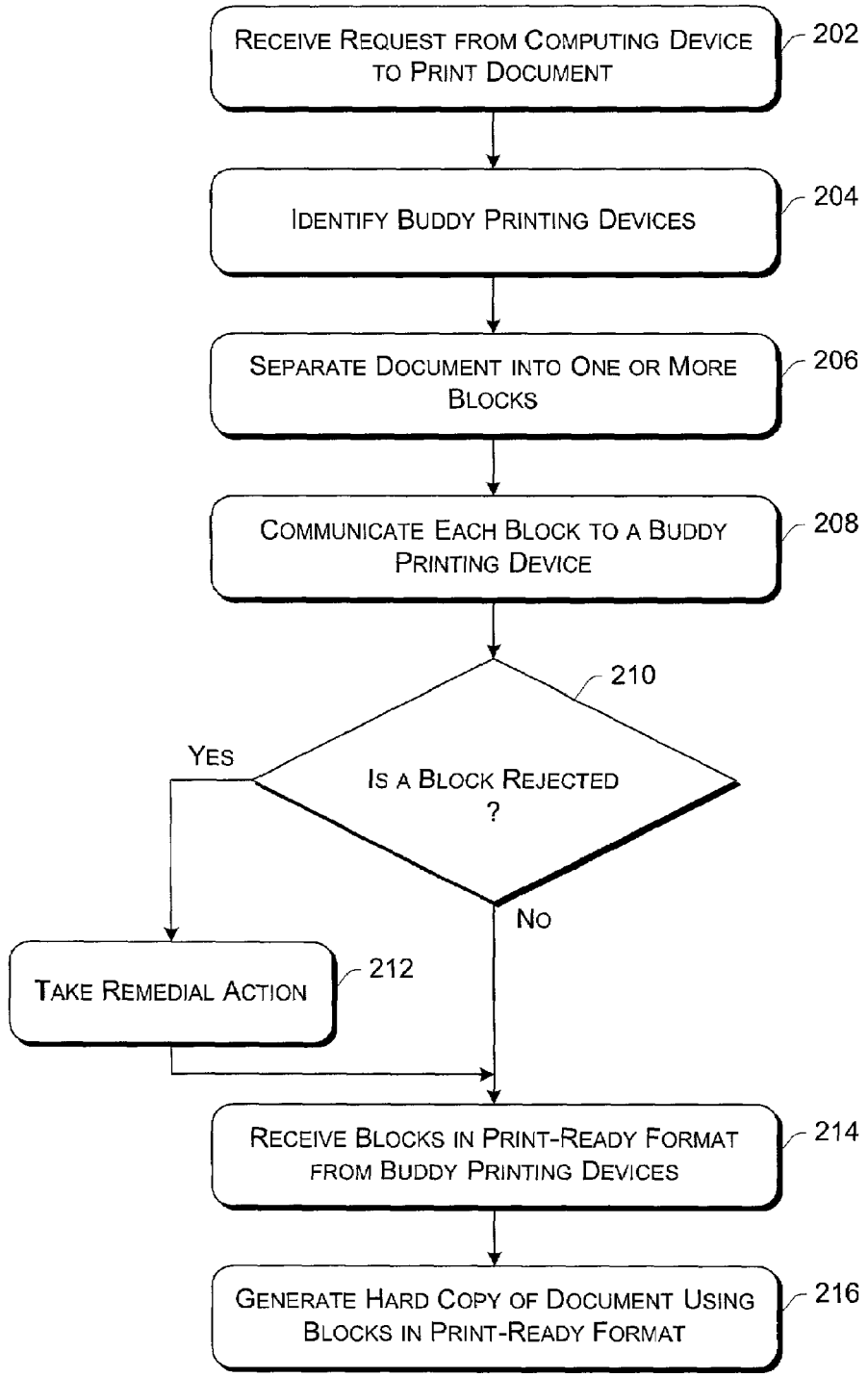
FIG. 4 is a flowchart illustrating an exemplary process performed by a principal printing device for collective document processing.

FIG. 4 is a flowchart illustrating an exemplary process 200 for collective document processing. The process of FIG. 4 is performed by a principal printing device, such as printer 150 of FIG. 3, and may be performed in software.

Initially, a request to print a document is received from a computing device (act 202). The buddy printing devices that will share in the processing of the document are identified (act 204), and the document is separated into one or more blocks (act 206). Each of these blocks is communicated to a buddy printing device (act 208). One or more of the blocks may be rejected by their corresponding buddy devices, so a check is made for each block as to whether it has been rejected (act 210). Accepted blocks may be explicitly accepted (e.g., by an "accept" message from the buddy device) or alternatively implicitly accepted (e.g., by the lack of a "reject" message from the buddy device).

If a block is rejected, then appropriate remedial action is taken for that block (act 212). Typically, this remedial action involves communicating the rejected block to one or more other buddy devices (or the principal device) for processing. After an amount of time elapses, the blocks are received in print-ready format from the buddy printing devices (act 214). A hard copy of the document is then generated using the blocks in print-ready format (act 216).

Figure 5:
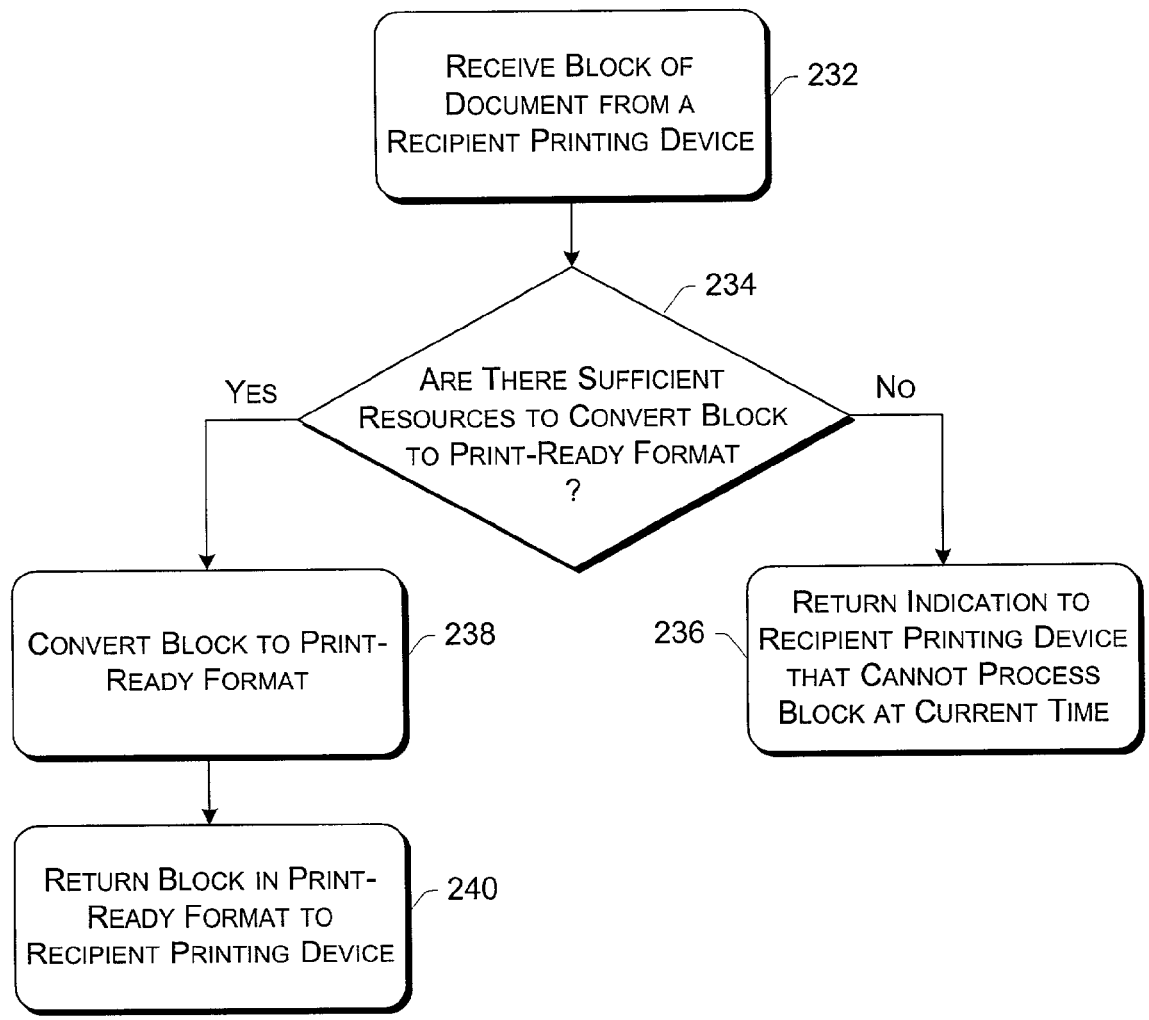
FIG. 5 is a flowchart illustrating an exemplary process performed by a buddy printing device for collective document processing.

FIG. 5 is a flowchart illustrating an exemplary process 230 for collective document processing. The process of FIG. 5 is performed by a buddy printing device, such as printer 150 of FIG. 3, and may be performed in software.

Initially, a block of a document is received from a principal printing device (act 232). A check is then made as to whether there are sufficient resources to convert the block to print-ready format (act 234). In one implementation, there are not sufficient resources if the buddy printing device is already processing another block or is printing a document itself. If there are not sufficient resources, then an indication is returned to the principal printing device that the buddy device cannot process the block at the current time (act 236). In other words, the buddy device rejects the block. However, if there are sufficient resources, then the block is converted to a print-ready format (act 238) and returned in print-ready format to the principal printing device (act 240).

The discussions herein refer primarily to software components and modules that can be executed by a computing device. It is to be appreciated, however, that the components and processes described herein can be implemented in software, firmware, hardware, or a combination thereof. By way of example, a programmable logic device (PLD) or application specific integrated circuit (ASIC) could be configured or designed to implement various components and/or processes discussed herein.

The discussions above make reference to modules of a printer making data available to other modules. Data can be made available in any of a wide variety of manners, such as sending a data structure that includes the data to another module (e.g., passing the module as a parameter when invoking a process or procedure of the module), sending an indication to another module of where the web page data is located (e.g., a pointer to the data in the printer's memory), sending an indication that the web page is available at some predetermined location (such as a particular address in the printer's memory), and so forth.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method implemented in a printing device, the method comprising:
   receiving a request to print a document, the request and document being received by the printing device;
   partitioning the document into one or more blocks;
   communicating, to each of one or more additional printing devices, at least one of the one or more blocks;
   beginning processing, at the printing device, of at least one of the blocks;
   receiving, from the one or more additional printing devices, a set of print-ready bits corresponding to the blocks communicated to the one or more additional printing devices;
   using, at the printing device, the received print-ready bits to print the document; and
   for a particular block, if an additional printing devices indicates it has generated the print-ready bits for the block then ceasing processing of the block and using the print-ready bits from the additional printing device to print the block of the document, and otherwise using print-ready bits generated by the printing device to print the block of the document.

2. A method as recited in claim 1, further comprising: converting, at the printing device, at least one of the one or more blocks into print-ready bits.

3. A method as recited in claim 1, wherein:
   receiving the request comprises receiving the request to print the document from a computing device via a network; and
   communicating at least one of the one or more blocks comprises communicating at least one of the one or more blocks to each of one or more additional printing devices via the network.

4. A method as recited in claim 1, further comprising: determining a value P for a page of the document having a particular page number (PageNumber) based on how many printing devices (NumPrinters) are in the one or more additional printing devices by performing the calculation, P=PageNumber mod NumPrinters; and communicating the page to the Pth printing device of the one or more additional printing devices.

5. A method as recited in claim 1, further comprising:
   identifying a plurality of printing devices to which the printing device is commumcatively coupled; and
   selecting one or more of the plurality of printing devices as the one or more additional printing devices to which the one or more blocks are communicated.

6. A method as recited in claim 1, wherein at least one of the blocks includes a different number of pages of the document than the other blocks.

7. A method as recited in claim 1, further comprising:
   sending a block of a test document to each of the one or more additional printing devices;
   measuring, for each of the one or more additional printing devices, a time elapsed between sending the block to the printing device and receiving print-ready bits corresponding to the block from the printing device; and
   determining a number of pages to be included in the block communicated to a particular additional printing device based on the measured time for the particular additional printing device relative to the measured times for the other additional printing devices.

8. A method as recited in claim 1, further comprising:
   receiving, from one of the additional printing devices, an indication that the one additional printing device is not able to convert a block to print-ready bits;
   and removing the one additional printing device from the one or more additional printing devices.

9. One or more computer readable media having stored thereon a plurality of instructions that, when executed by one or more controllers of a printing device, causes the one or more controllers to perform acts comprising:
   receiving a request to print a document, the request and document being received by the printing device;
   partitioning the document into one or more portions;
   communicating, to each of one or more additional printing devices, at least one of the one or more portions;
   beginning processing, at the printing device, of at least one of the blocks;
   receiving, from the one or more additional printing devices, a set of print-ready bits corresponding to the portions communicated to the one or more additional printing devices;
   using, at the printing device, the received print-ready bits to print the document; and
   for a particular block, if an additional printing devices indicates it has generated the print-ready bits for the block then ceasing processing of the block and using the print-ready bits from the additional printing device to print the block of the document, and otherwise using print-ready bits generated by the printing device to print the block of the document.

10. A system comprising:
    a principal printing device including a collective printing control module and a print engine;

a plurality of buddy printing devices, each coupled to the principal printing device via a network, and each including a buddy controller module;

wherein the collective printing control module is configured to communicate, upon receipt of a request from a computing device to print a document, a different portion of the document to each of the plurality of buddy printing devices;

wherein the buddy controller module of each buddy printing device is configured to convert the portion of the document received from the principal printing device into a print-ready format and return the portion in the print-ready format to the principal printing device; and wherein the collective printing control module is further configured to transfer the portions in print-ready format to the print engine for printing.

11. A system as recited in claim 10, wherein the collective printing control module is further configured to:

send a test document to each of the plurality of buddy printing devices;

measure, for each of the plurality of printing devices, a time elapsed between sending the test document to the printing device and receiving the test document in print-ready format from the printing device; and determine a number of pages to be included in the portion communicated to a particular buddy printing device based on the measured time for the particular buddy printing device relative to the measured times for the other buddy printing devices.

12. A system as recited in claim 10, wherein the buddy controller module of each buddy printing device is further configured to:

check, in response to receiving the portion of the document, whether the printing device can currently devote resources to converting the portion;

if the printing device cannot currently devote resources to converting the one or more portion, then to communicate to the principal printing device an indication that the printing device cannot currently devote resources to converting the portion; and otherwise, to convert the portion of the document received from the principal printing device into a print-ready format and return the portion in the print-ready format to the principal printing device.

* * * * *

UNITED STATES PATENT AND TRADEMARK OFFICE
CERTIFICATE OF CORRECTION

PATENT NO.        : 7,102,779 B2
APPLICATION NO.   : 10/045511
DATED             : September 5, 2006
INVENTOR(S)       : Samuel M. Lester et al.

Page 1 of 1

It is certified that error appears in the above-identified patent and that said Letters Patent is hereby corrected as shown below:

In column 1, line 26, delete "modem" and insert -- modern --, therefor.

In column 10, line 16, in Claim 5, delete "commumcatively" and insert -- communicatively --, therefor.

Signed and Sealed this

Twenty-sixth Day of May, 2009

JOHN DOLL
*Acting Director of the United States Patent and Trademark Office*